United States Patent [19]

Hoch et al.

[11] 4,059,562
[45] Nov. 22, 1977

[54] LIQUID STABILIZER SYSTEMS AND VINYL HALIDE RESIN COMPOSITIONS CONTAINING SAME

[75] Inventors: Samuel Hoch, Brooklyn; Mario Q. Ceprini, Cedarhurst, both of N.Y.; Emery Szabo, Freehold, N.J.

[73] Assignee: Tenneco Chemicals, Inc., Saddle Brook, N.J.

[21] Appl. No.: 779,650

[22] Filed: Mar. 21, 1977

[51] Int. Cl.$^2$ .............................................. C08K 5/58
[52] U.S. Cl. ........................ 260/45.75 S; 260/45.7 P; 260/45.95 L; 252/406; 260/429.7
[58] Field of Search ............... 260/45.7 P, 45.75 S, 260/45.95; 252/406

[56] References Cited

U.S. PATENT DOCUMENTS

| | | | |
|---|---|---|---|
| 2,885,377 | 5/1959 | Knowles et al. | 260/45.7 P |
| 3,503,924 | 3/1970 | Pollock | 260/45.75 S |
| 3,507,827 | 4/1970 | Pollock | 260/45.75 S |
| 3,665,024 | 5/1972 | Oakes et al. | 260/45.75 S |
| 3,817,915 | 6/1974 | Kauder et al. | 260/45.75 S |
| 3,919,168 | 11/1975 | Dieckmann | 260/45.7 P |
| 3,943,097 | 3/1976 | Kawagoshi et al. | 260/45.7 P |
| 3,953,358 | 4/1976 | Sjogreen | 260/45.95 P |

*Primary Examiner*—V.P. Hoke

*Attorney, Agent, or Firm*—Evelyn Berlow

[57] ABSTRACT

Vinyl halide resin compositions that are characterized by excellent early color and color hold, excellent long term heat and light stability, and good processability contain a liquid stabilizer system that comprises a. 40% to 90% by weight of an organotin ethanol mercaptide having the structural formula

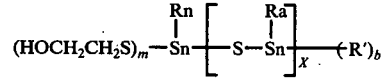

wherein each R represents an alkyl group having 1 to 8 carbon atoms, R' represents —SCH$_2$CH$_2$OH, —SCH$_2$COOR", or —SR", R" represents an alkyl group having 6 to 18 carbon atoms, $a$, $b$, $m$, and $n$ each represents 1 or 2, X represents 0 or 1, when X is 0, $m + n + b = 4$, and when X is 1, $m + n = 3$ and $a + b = 3$;

b. 10% to 60% by weight of a liquid alcohol component comprising a glycol having 2 to 10 carbon atoms; and c. 0.1% to 1% by weight of an alkyl acid phosphate.

25 Claims, No Drawings

LIQUID STABILIZER SYSTEMS AND VINYL HALIDE RESIN COMPOSITIONS CONTAINING SAME

This invention relates to liquid stabilizer systems for vinyl halide resin compositions and to resinous compositions stabilized therewith. More particularly, it relates to vinyl halide resin compositions that contain a stabilizer system comprising an organotin ethanol mercaptide, a liquid alcohol component comprising a glycol having 2 to 10 carbon atoms, and an alkyl acid phosphate.

It is well known that vinyl halide resins undergo undesirable changes when they are exposed to heat and to light and that these changes lead to discoloration and to deterioration of the mechanical properties of the compositions. Since elevated temperatures are required for the processing of these resins and since the resins are exposed to light when they are subsequently used, it is necessary to incorporate in the vinyl halide resin compositions stabilizers that will inhibit or prevent their discoloration when they are exposed to heat and to light.

Organotin compounds that contain sulfur have long been recognized as highly effective heat stabilizers for vinyl halide resin compositions. The stabilizing effectiveness of these compounds is generally directly related to their tin content and to a lesser extent to their sulfur content. The organotin compounds that have high tin and sulfur contents, however, have several disadvantages that have severely limited their use. These compounds, which are expensive relative to other available stabilizers, often impart a yellow cast and haze to vinyl halide resin compositions during the first few minutes of heating, and they cause the development during processing of a strong, unpleasant odor, which remains noticeable in the finished product. Many of these compounds are unstable and decompose quickly to form inactive compounds. In addition, the organotin compounds that have high tin and sulfur contents are often glassy, very viscous materials that are difficult to handle and to incorporate into resinous compositions.

While the use of organotin compounds and mercaptoalcohols is known in the art, there has been no teaching of stabilizer systems derived from these materials that prevent the degradation of vinyl halide resins at elevated temperatures without imparting early color, cloudiness, or odor to them and that do not undergo decomposition on storage.

In U.S. Pat. No. 3,063,963, Wooten et al. disclosed the use of combinations of organotin carboxylates of mono- or dicarboxylic acids with omega-mercapto acid esters or omega-mercaptoalcohols to improve the weathering resistance of polyvinyl chloride resins. There is no suggestion that early discoloration was lessened in the compositions that were disclosed. Combinations of organotin mercaptocarboxylic acid esters with mercaptocarboxylic acids and mercaptoalcohols were disclosed by Pollock in U.S. Pat. No. 3,507,827.

Ramsden in U.S. Pat. No. 2,885,415 taught the use of organotin derivatives of mercaptoalcohols as stabilizers for chlorine-containing resins. These compounds, which have one of the formulas R₃Sn(SR'OH), R₃Sn—S—R'O—SR₃, and

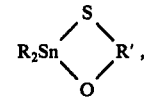

wherein R and R' are hydrocarbon radicals, are viscous liquids or crystalline solids that are difficult to handle and to incorporate into resinous compositions and that tend to decompose on standing.

It has now been found that stabilizer systems that impart excellent initial color and clarity and excellent long term heat and light stability to vinyl halide resin compositions result when an organotin ethanol mercaptide is combined with a liquid alcohol component that comprises a glycol and an alkyl acid phosphate. The resulting stabilizer systems are light colored, non-viscous liquids that are convenient to handle and that can be readily incorporated into resinous compositions. They are stable and can be stored for prolonged periods without losing their effectiveness. These stabilizer systems have the further advantage of substantially eliminating the development of objectionable odors during the processing of the resinous compositions as well as residual odors previously encountered in finished products that contain organotin mercaptide or organotin sulfide stabilizers.

The first component of the liquid stabilizer systems of this invention is an organotin ethanol mercaptide having the structural formula

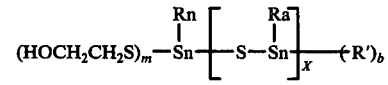

wherein each R represents an alkyl group having 1 to 8 carbon atoms; R' represents —SCH₂CH₂OH, —SCH₂COOR", or —SR"; R" represents an alkyl group having 6 to 18 carbon atoms; $a$, $b$, $m$, and $n$ each represents 1 or 2; X represents 0 or 1; when X is 0, $m + n + = 4$; and when X is 1, $m + n = 3$ and $a + b = 3$.

A preferred group of organotin ethanol mercaptides have the structural formula

wherein R, R", $m$, $n$, and $b$ have the aforementioned significance, R° represents —SCH₂COOR" or —SR", and $m + n + b = 4$. Illustrative of these compounds are monobutyltin mono (hexyl thioglycolate) di(ethanol mercaptide), monooctyltin mono(dodecyl thioglycolate) di(ethanol mercaptide), monomethyltin mono(octadecyl thioglycolate) di(ethanol mercaptide), monobutyltin mono (dodecyl mercaptide) di(ethanol mercaptide), monomethyltin mono (hexyl mercaptide) di(ethanol mercaptide), monobutyltin di(hexyl mercaptide) mono(ethanol mercaptide), monooctyltin di(hexyl thioglycolate) mono(ethanol mercaptide), monobutyltin di(isooctyl thioglycolate) mono(ethanol mercaptide), dimethyltin mono(isodecyl thioglycolate) mono(ethanol mercaptide), dihexyltin mono(octadecyl thioglycolate) mono(ethanol mercaptide), dioctyltin mono(octadecyl mercaptide) mono(ethanol mercaptide), and dimethyltin mono(hexyl mercaptide) mono(ethanol mercaptide).

Another preferred group of organotin ethanol mercaptides have the structural formula

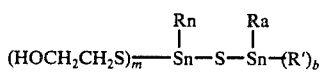

wherein R, R', R", a, b, m, and n have the aforementioned significance; $a + b = 3$; and $m + n = 3$. Illustrative of these compounds are bis[monobutyltin di(ethanol mercaptide)]sulfide, bis[monooctyltin di(ethanol mercaptide)]sulfide, bis[dimethyltin mono(ethanol mercaptide)]sulfide, [dibutyltin mono(dodecyl mercaptide)] [dibutyltin mono(ethanol mercaptide)]sulfide, [dioctyltin mono(hexyl mercaptide)] [dioctyltin mono(ethanol mercaptide)]sulfide, [dimethyltin mono(octadecyl thioglycolate)] [dimethyltin mono(ethanol mercaptide)]sulfide, [monobutyltin di(octadecyl mercaptide)] [monobutyltin di(ethanol mercaptide)]sulfide, [monomethyltin di(2-ethylhexyl thioglycolate)] [monomethyltin di(ethanol mercaptide)]sulfide, and [monobutyltin di(dodecyl thioglycolate)] [dibutyltin mono(ethanol mercaptide)]sulfide.

A single organotin ethanol mercaptide or a mixture of two or more of these compounds may be present in the liquid stabilizer systems.

The organotin ethanol mercaptides can be prepared by any suitable procedure, for example, by heating an alkyltin compound, such as an alkylstannoic acid, an alkyltin oxide, or an alkyltin hydroxide, with a mercaptoethanol and a sulfur-containing compound, such as an alkyl mercaptan, an alkyl thioglycolate, and/or a sulfide, at a temperature between about 90° C. and 130° C. under subatmospheric pressure until the water evolved during the reaction has been removed from the reaction mixture. Because some of the compounds prepared in this way are unstable liquids that start to decompose to form inactive crystalline products on standing for several days at room temperature, the freshly-prepared organotin ethanol mercaptides are ordinarily dissolved in a solvent that contains the liquid alcohol component and the alkyl acid phosphate to form the stable liquid stabilizer systems of this invention.

The liquid alcohol component in which the organotin ethanol mercaptide is dissolved comprises a glycol having 2 to 10 carbon atoms. Suitable glycols include ethylene glycol, 1,2-propanediol, 1,3-propanediol, 2-methyl-1,2-propanediol, 1,2- butanediol, 1,3-butanediol, 1,4-butanediol, 3-methyl-1,2-butanediol, 1,4-pentanediol, 1,5-pentanediol, 2-methyl-2,4-pentanediol (hexylene glycol), 2,2-dimethyl-1,5-pentanediol, 2-ethyl-1,3-hexanediol, 1,7-heptanediol, and the like and mixtures thereof. A preferred glycol is 2-methyl-2,4-pentanediol (hexylene glycol).

The liquid alcohol component may also contain one or more straight-chain or branched-chain alkanols having 4 to 18 carbon atoms. These include butanol, isobutanol, n-hexanol, 2-ethylhexanol, n-octanol, dodecanol, isotridecanol, n-octadecanol, isooctadecanol, and mixtures thereof. It may also contain a small amount of a polyhydric alcohol, such as glycerol or a water-insoluble trihydric or tetrahydric alcohol having a molecular weight of about 300 to 6000. The preferred polyhydric alcohols are polyethers formed by the reaction of propylene oxide with glycerol, trimethylolpropane, or pentaerythritol.

Particularly good results have been obtained when the liquid alcohol component of the stabilizer system contained from 50% to 100% by weight of hexylene glycol and up to 50% by weight of one or more straight-chain and/or branched-chain monohydric alcohols having 8 to 15 carbon atoms.

The liquid stabilizer systems also contain a small amount of an alkyl acid phosphate, which enhances their stability. It may be a monoalkyl acid phosphate, a dialkyl acid phosphate, or a mixture of mono- and dialkyl acid phosphates in which each alkyl group has from 1 to 10 carbon atoms, Examples of these alkyl acid phosphates include methyl acid phosphate, isopropyl acid phosphate, n-butyl acid phosphate, secondary isoamyl acid phosphate, hexyl acid phosphate, 2-ethylhexyl acid phosphate, n-decyl acid phosphate, diethyl acid phosphate, di-secondary isohexyl acid phosphate, di-n-octyl acid phosphate, ethyl 2-ethylhexyl acid phosphate, and isobutyl n-octyl acid phosphate.

While a single alkyl acid phosphate can be used, in most cases it is preferred that a mixture that contains at least one monoalkyl acid phosphate and at least one dialkyl acid phosphate be used. Such mixtures of alkyl acid phosphates can be prepared, for example, by reacting about 2.5 moles to 3.5 moles of one or more alcohols with one mole of phosphorus pentoxide. The alcohols that can be used in this reaction are primary, secondary, and tertiary alkanols that have from 1 to 10 carbon atoms. Stabilizer systems having exceptionally good shelf stability have resulted when the alkyl acid phosphate used in their preparation was the mixture of acid phosphates that resulted when 3 moles of methyl isobutyl carbinol (4-methylpentanol-2) was reacted with one mole of a phosphorus pentoxide. The term "secondary 4-methylpentyl acid phosphate" is used herein to identify this mixture of mono- and di-acid phosphates.

As has been indicated, the liquid stabilizer systems can be prepared by dissolving freshly-prepared organotin ethanol mercaptides in a solvent that contains a liquid alcohol component and an alkyl acid phosphate. They are preferably prepared by carrying out the reaction between the organotin compound, mercaptoethanol, and sulfur containing compound to form the organotin ethanol mercaptide in the presence of all or part of the liquid alcohol component and adding to the resulting solution any remaining alcohol and the alkyl acid phosphate or by carrying out the reaction in the presence of both the alcohol component and the alkyl acid phosphate.

The stabilizer systems of this invention are non-viscous, clear, light-colored liquids that have little or no tendency to decompose on standing and that are more effective as stabilizers for vinyl halide resins than the organotin ethanol mercaptides that they contain. These stabilizer systems contain from about 40% to 90% by weight of an organotin ethanol mercaptide, 10% to 60% by weight of the liquid alcohol component, and 0.1% to 1% by weight of the alkyl acid phosphate. They preferably contain 60% to 90% by weight of an organotin ethanol mercaptide, 10% to 40% by weight of a liquid alcohol component that comprises hexylene glycol, and 0.2% to 0.6% by weight of secondary 4-methylpentyl acid phosphate.

In addition to the aforementioned components, the liquid stabilizer systems of this invention may contain other heat and light stabilizers such as other organotin compounds, salts of barium, cadmium, and other polyvalent metals, and organic phosphites, antioxidants, lubricants, solvents, and other additives that are ordinarily employed in the production of stabilized vinyl halide resin compositions.

Only a small amount of one of these liquid stabilizer systems need be incorporated into vinyl halide resin compositions to impart heat and light stability to them. As little as 0.2% of one of these stabilizer systems, based on the weight of the vinyl halide resin, will bring about an appreciable improvement in the heat stability of the compositions. Five percent or more of the stabilizer systems can be used, but these larger amounts generally do not provide further improvement in the properties of the resinous compositions and for this reason are not ordinarily used. In most cases, from 0.3% to 3% by weight, based on the weight of the vinyl halide resin of a liquid stabilizer system gives the most advantageous results.

The stabilizer systems of this invention are of particular value in the stabilization of rigid polyvinyl chloride compositions, that is, compositions that are formulated to withstand temperatures of at least 175° C., for example, the pigmented compositions used in the production of pipe. The novel stabilizer systems can also be used in plasticized vinyl halide resin compositions of conventional formulation where high softening point is not a requisite.

The vinyl halide resins that may be present in the stabilized resinous compositions include both vinyl halide homopolymers, such as polyvinyl chloride, polyvinyl bromine, and polyvinylidene chloride, and copolymers formed by the polymerization of a vinyl halide with up to about 30 percent of a comonomer, such as vinyl acetate, vinyl propionate, vinyl butyrate, vinylidene chloride, styrene, ethylene, propylene, ethyl acrylate, methyl methacrylate, acrylic acid, and the like. The invention is also applicable to mixtures containing a major proportion of a vinyl halide resin and a minor proportion of another synthetic resin, such as chlorinated polyethylene, polyacrylate resins, polymethacrylate esters, polyacrylonitrile, and terpolymers of acrylonitrile, butadiene, and styrene. Any of the well-known plasticizers for vinyl halide resins, such as dioctyl phthalate, dibutyl sebacate, tricresyl phosphate, and octyl diphenyl phosphate, can be present in the stabilized compositions.

In addition to the aforementioned ingredients, the stabilized resinous compositions may contain other resin additives, such as pigments, dyes, processing aids, impact modifiers, extenders, and lubricants, in the amounts ordinarily employed for the purposes indicated.

The stabilized vinyl halide resin compositions may be prepared by any suitable and convenient procedure. Such procedures include dry blending with a conventional mixer such as the Henschel blender, mixing on a two or three roll heated mill, and tumbling.

The invention is further illustrated by the following examples.

EXAMPLE 1

To a mixture of 300 grams of water, 407.8 grams (1.447 moles) of butyltin trichloride, and 225.6 grams (2.889 moles) of 2-mercaptoethanol at 60°-70° C. was added over a period of 15 minutes 478.2 grams (2.893 moles) of a 24.2% aqueous sodium hydroxide solution. The reaction mixture was agitated for 30 minutes, and then there was added to it at 55°-65° C. over a 10 minute period a solution of 94 grams (0.722 mole) of sodium sulfide (60% $Na_2S$) in 300 grams of water. After the mixture had been agitated for 15 minutes at 55°-65° C., there was added to it 49.5 grams of the mixture of $C_{12-15}$ alkanols containing 85% of straight-chain alcohols and 15% of α-branched-chain alcohols that is marketed as Shell Neodol 25, and 6.1 grams of 2-ethylhexanol. The mixture was agitated at 55°-65° C. for 30 minutes and then allowed to separate into two layers. To the isolated organic layer was added 378.8 grams of hexylene glycol (2-methyl-2,4-pentanediol). After the resulting solution had been dried at 90°-95° C./75-85 mm Hg absolute while being sparged with nitrogen, 1.6 grams of secondary 4-methylpentyl acid phosphate was added to it, and the resulting solution was filtered.

There was obtained 894 grams of a clear, light-yellow liquid that remained clear on standing at room temperature. This product was a solution of bis[monobutyltin di(ethanol mercaptide)] sulfide in a solvent that was a mixture of hexylene glycol, $C_{12-15}$ alkanols, 2-ethylhexanol, and secondary 4-methylpentyl acid phosphate. It contained 19.0% Sn and 12.4% S (calculated, 18.3% Sn and 12.3% S).

EXAMPLE 2

To a mixture of 75.0 grams of water, 389.0 grams (1.281 moles) of dibutyltin dichloride, 132.4 grams (0.640 mole) of lauryl mercaptan (97.8%), and 50.1 grams (0.641 mole) of 2-mercaptoethanol at 55°-65° C. was added over a 30 minute period 211.8 grams (1.281 moles) of a 24.2% sodium hydroxide solution. After the reaction mixture had been agitated at 55°-65° C. for 30 minutes, there was added to it a solution of 81.7 grams (0.628 mole) of sodium sulfide (60% $Na_2S$) in 300 grams of water. The reaction mixture was agitated for 30 minutes and then allowed to separate into two layers. The isolated organic layer was dried by heating it at 95°-100° C./75-80 mm Hg absolute while sparging it with nitrogen. After the addition of 2.5 grams of secondary 4-methylpentyl acid phosphate and 88.7 grams of hexylene glycol to it, the product was filtered.

There was obtained 573 grams of a stable, clear, light-yellow liquid which was a solution of [dibutyltin mono(dodecylmercaptide)][dibutyltin mono(ethanol mercaptide)] sulfide in a solvent that consisted of hexylene glycol and secondary 4-methylpentyl acid phosphate. It contained 25.8% Sn and 10.3% S (calculated 25.8% Sn and 10.4% S).

EXAMPLE 3

A mixture of 130.4 grams (0.632 mole) of isocotyl thioglycolate, 98.7 grams (1.264 moles) of 2-mercaptoethanol, 131.8 grams (0.632 mole) of butylstannoic acid, and 159.3 grams of hexylene glycol was heated at 90°-95° C./110-120 mm Hg absolute and sparged with nitrogen until the theoretical 22.7 ml. of evolved water had been collected. To the resulting mixture was added 2.5 grams of secondary 4-methylpentyl acid phosphate. After filtration there was obtained 481 grams of a stable, clear, light-yellow liquid, which was a solution of monobutyltin mon(isooctyl thioglycolate) di(ethanol mercaptide) in a solvent that consisted of hexylene glycol and secondary 4-methylpentyl acid phosphate. It contained 14.9% Sn and 12.0% S (calculated, 15.0% Sn and 12.1% S).

EXAMPLE 4

A mixture of 130.4 grams (0.632 mole) of isooctyl thioglycolate, 49.3 grams (0.632 mole) of 2-mercaptoethanol, 159.2 grams (0.632 mole) of dibutyltin oxide (47.1% Sn), and 170 grams of hexylene glycol was heated at 90°–95° C./120–125 mm Hg absolute and sparged with nitrogen until the theoretical 11.4 ml. of evolved water had been collected. After the addition of 2.5 grams of secondary 4-methylpentyl acid phosphate to it, the reaction mixture was filtered. There was obtained 482 grams of a stable, clear, light-yellow liquid, which was a solution of dibutyltin mono(isooctyl thioglycolate) mono(ethanol mercaptide) in a solvent that consisted of hexylene glycol and secondary 4-methylpentyl acid phosphate. It contained 15.5% Sn and 8.1% S (calculated, 15.0% Sn and 8.1% S).

EXAMPLE 5

A mixture of 130.6 grams (0.632 mole) of lauryl mercaptan (97.8%), 98.7 grams (1.264 moles) of 2-mercaptoethanol, 131.8 grams (0.632 mole) of butylstannoic acid, and 159.1 grams of hexylene glycol was heated at 90°–95° C./110–120 mm Hg absolute and sparged with nitrogen until the theoretical 22.7 grams of evolved water had been collected. After the addition of 2.5 grams of secondary 4-methylpentyl acid phosphate to it, the reaction mixture was filtered. There was obtained 485 grams of a stable, clear, light-yellow liquid, which was a solution of monobutyltin mono(dodecyl mercaptide) di(ethanol mercaptide) in a solvent that consisted of hexylene glycol and secondary 4-methylpentyl acid phosphate. It contained 15.3% Sn and 12.0% S (calculated, 15.0% Sn and 12.1% S).

EXAMPLE 6

A mixture of 314.3 grams (1.520 moles) of lauryl mercaptan (97.8%), 58.8 grams (0.753 mole) of 2-mercaptoethanol, and 157.0 grams (0.753 mole) of butylstannoic acid was heated at 120°–130° C./75–85 mm Hg absolute and sparged with nitrogen until the theoretical 27.1 ml. of evolved water had been collected. To the resulting monobutyltin di(dodecyl mercaptide) mono(ethanol mercaptide), which had been cooled to 110°–115° C., was added 2.5 grams of secondary 4-methylpentyl acid phosphate, 44.6 grams of hexylene glycol, 39.7 grams of the mixture of $C_{12-15}$ alkanols containing 85% of straight-chain alcohols and 15% of α-branched-chain alcohols that is marketed as Shell Neodol 25, and 4.9 grams of 2-ethylhexanol. The mixture was agitated until homogeneous and then filtered.

There was obtained 582 grams of a stable, clear, light-yellow liquid, which was a solution of monobutyltin di(dodecyl mercaptide) mono(ethanol mercaptide) in a mixture of alcohols that contained secondary 4-methylpentyl acid phosphate. It contained 15.1% Sn and 12.7% S (calculated, 15.0% Sn and 12.2% S).

EXAMPLE 7

A mixture of 130.6 grams (0.632 mole) of lauryl mercaptan (97.8%), 49.3 grams (0.632 mole) of 2-mercaptoethanol, 159.2 grams (0.632 mole of dibutyltin oxide (47.1% Sn), and 170 grams of hexylene glycol was heated at 90°–95° C./120–125 mm Hg absolute and sparged with nitrogen until the theoretical 11.4 ml. of evolved water had been collected. After the addition of 2.5 grams of secondary 4-methylpentyl acid phosphate to it, the reaction mixture was filtered. There was obtained 483 grams of a stable, clear, light-yellow liquid, which was a solution of dibutyltin mono(dodecyl mercaptide) mono(ethanol mercaptide) in a solvent that consisted of hexylene glycol and secondary 4-methylpentyl acid phosphate. It contained 15.5% Sn and 8.0% S (calculated, 15.0% Sn and 8.1% S).

EXAMPLE 8

A mixture of 100 parts by weight of polyvinyl chloride (Tenneco 225), 1.25 parts by weight of lubricant (Wax XL-355), 1.2 parts by weight of acrylic resin (Tenneco Supercryl 100), 1.0 part by weight of titanium dioxide, 1.0 part by weight of calcium carbonate, 0.35 part by weight of calcium stearate, and 0.40 part by weight of one of the stabilizer systems of this invention or a comparative stabilizer was blended in a Henschel blender at 3000 rpm at 60°–85° C. until a uniform composition was obtained. Then 62.5 parts of the mixture was worked in a Brabender Plasticorder using a bowl temperature of 178° C. and a rotor speed of 60 rpm. Samples were removed at 1 or 2 minute intervals and observed for color development. The results obtained are summarized in the following table. In this table, a rating of 1–2 indicates white; 3–4, off-white; 5–6, slightly yellow; and 7–8, yellow.

| Stabilizer | Color Development after indicated number of minutes in Brabender Plasticorder at 178° C. | | | | | | | | |
|---|---|---|---|---|---|---|---|---|---|
| | 1 | 2 | 3 | 4 | 6 | 8 | 10 | 12 | 14 |
| Product of Ex. 1 | 1 | 1 | 1 | 1 | 1 | 2 | 2 | 3 | 3 |
| Product of Ex. 2 | 1 | 2 | 3 | 4 | 4 | 5 | — | — | — |
| Product of Ex. 3 | 1 | 1 | 1 | 1 | 3 | 5 | 7 | 8 | 8 |
| Product of Ex. 4 | 3 | 4 | 5 | 6 | 7 | 8 | — | — | — |
| Product of Ex. 5 | 1 | 1 | 2 | 2 | 3 | 3 | 4 | 4 | 5 |
| Comparative Stabilizers | | | | | | | | | |
| Dibutyltin bis (isooctyl thioglycolate) | 1 | 2 | 3 | 4 | 5 | 6 | 7 | 8 | 8 |
| Dibutyltin bis (dodecyl mercaptide) | 4 | 6 | 6 | 7 | 7 | 8 | — | — | — |

From the data in the foregoing table, it will be seen that the compositions containing the stabilizers that are the products of Examples 1, 3, and 5 were far superior in early color and color hold to those that contained the comparative stabilizers, both of which are widely used commercially in rigid polyvinyl chloride formulations that are used in the production of pipe and bottles. The composition stabilized with the product of Example 2 also had better early color and color hold than those containing a comparative stabilizer, while that stabilized with the product of Example 4 was superior in early color and color hold to that containing dibutyltin bis lauryl mercaptide.

What is claimed is:
1. A liquid stabilizer system for vinyl halide resin compositions that comprises a. 40% to 90% by weight of an organotin ethanol mercaptide having the structural formula

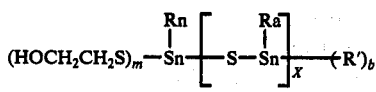

wherein each R represents an alkyl group having 1 to 8 carbon atoms,
R' represents —SCH$_2$CH$_2$OH, —SCH$_2$COOR", or —SR";
R" represents an alkyl group having 6 to 18 carbon atoms;
a, b, m, and n each represents 1 or 2;
X represents 0 or 1;
when X is 0, $m + n + b = 4$; and
when X is 1, $m + n = 3$ and $a + b = 3$;
b. 10% to 60% by weight of a liquid alcohol component comprising a glycol having 2 to 10 carbon atoms; and
c. 0.1% to 1% by weight of an alkyl acid phosphate selected from the group consisting of monoalkyl acid phosphates, dialkyl acid phosphates, and mixtures thereof, in which each alkyl group has from 1 to 10 carbon atoms.

2. A liquid stabilizer system as defined in claim 1 that comprises
a. 60% to 90% by weight of the organotin ethanol mercaptide;
b. 10% to 40% by weight of the liquid alcohol component; and
c. 0.2% to 0.6% by weight of the alkyl acid phosphate.

3. A liquid stabilizer system as defined in claim 1 wherein the organotin ethanol mercaptide has the structural formula

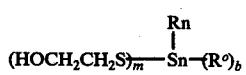

wherein R represents an alkyl group having 1 to 8 carbon atoms;
R' represents —SCH$_2$COOR" or —SR",
R" represents an alkyl group having 6 to 18 carbon atoms;
b, m, and n each represents 1 or 2; and
$m + n + b = 4$.

4. A liquid stabilizer system as defined in claim 3 wherein the organotin ethanol mercaptide is monobutyltin mono(isooctyl thioglycolate) di(ethanol mercaptide).

5. A liquid stabilizer system as defined in claim 3 wherein the organotin ethanol mercaptide is dibutyltin mono(isooctyl thioglycolate) mono(ethanol mercaptide).

6. A liquid stabilizer system as defined in claim 3 wherein the organotin ethanol mercaptide is monobutyltin mono(dodecyl mercaptide) di(ethanol mercaptide).

7. A liquid stabilizer system as defined in claim 1 wherein the organotin ethanol mercaptide has the structural formula

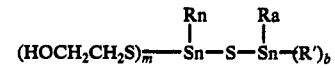

wherein
each R represents an alkyl group having 1 to 8 carbon atoms;
R' represents —SCH$_2$CH$_2$OH, —SCH$_2$COOR", or —SR";
R" represents an alkyl group having 6 to 8 carbon atoms;
a, b, m, and n each represents 1 or 2;
$a + b = 3$; and
$m + n = 3$.

8. A liquid stabilizer system as defined in claim 7 wherein the organotin ethanol mercaptide is bis[monobutyltin di(ethanol mercaptide)]sulfide.

9. A liquid stabilizer system as defined in claim 7 wherein the organotin ethanol mercaptide is [dibutyltin mono(dodecyl mercaptide)][dibutyltin mono(ethanol mercaptide)] sulfide.

10. A liquid stabilizer system as defined in claim 1 wherein the liquid alcohol component comprises hexylene glycol.

11. A liquid stabilizer system as defined in claim 1 wherein the liquid alcohol component comprises hexylene glycol and an alkanol having 4 to 18 carbon atoms.

12. A liquid stabilizer system as defined in claim 1 wherein the alkyl acid phosphate is secondary 4-methylpentyl acid phosphate.

13. A heat and light stable resinous composition comprising a vinyl halide resin and 0.2 percent to 5 percent by weight, based on the weight of the vinyl halide resin, of a liquid stabilizer that comprises
40% to 90% by weight of an organotin ethanol mercaptide having the structural formula

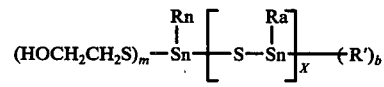

wherein each R represents an alkyl group having 1 to 8 carbon atoms;
R' represents —SCH$_2$CH$_2$OH, —SCH$_2$COOR", or —SR";
R" represents an alkyl group having 6 to 18 carbon atoms;
a, b, m, and n each represents 1 or 2;
X represents 0 or 1;
when X is 0, $m + n + b = 4$; and
when X is 1, $m + n = 3$ and $a + b = 3$;
b. 10% to 60% by weight of a liquid alcohol component comprising a glycol having 2 to 10 carbon atoms; and
c. 0.1% to 1% by weight of an alkyl acid phosphate selected from the group consisting of monoalkyl acid phosphates, dialkyl acid phosphates, and mixtures thereof, in which each alkyl group has from 1 to 10 carbon atoms.

14. A heat and light stable resinous composition as defined in claim 13 wherein the vinyl halide resin is polyvinyl chloride.

15. A heat and light stable resinous composition as defined in claim 13 that contains from 0.3% to 3% by weight, based on the weight of the vinyl halide resin, of the stabilizer system.

16. A heat and light stable resinous composition as defined in claim 13 wherein the liquid stabilizer system comprises
a. 60% to 90% by weight of the organotin ethanol mercaptide;
b. 10% to 40% by weight of the liquid alcohol component, and
c. 0.2% to 0.6% by weight of the alkyl acid phosphate.

17. A heat and light stable resinous composition as defined in claim 13 wherein the organotin ethanol mercaptide has the structural formula

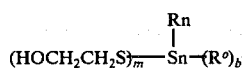

wherein R represents an alkyl group having 1 to 8 carbon atoms;
R° represents —SCH$_2$COOR" or —SR";
R" represents an alkyl group having 6 to 18 carbon atoms;
$b$, $m$, and $n$ each represents 1 to 2; and
$m + n + b = 4$.

18. A heat and light stable resinous composition as defined in claim 17 wherein the organotin ethanol mercaptide is monobutyltin mono(isooctyl thioglycolate) di(ethanol mercaptide).

19. A heat and light stable resinous composition as defined in claim 17 wherein the organotin ethanol mercaptide is monobutyltin mono(dodecyl mercaptide) di(ethanol mercaptide).

20. A heat and light stable resinous composition as defined in claim 13 wherein the organotin ethanol mercaptide has the structural formula

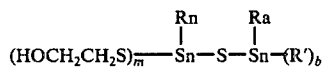

wherein each
R represents an alkyl group having 1 to 18 carbon atoms;
R' represents —SCH$_2$CH$_2$OH, —SCH$_2$COOR", or —SR";
R" represents an alkyl group having 6 to 18 carbon atoms;
$a$, $b$, $m$, and $n$ each represents 1 or 2;
$a + b = 3$; and
$m + n = 3$.

21. A heat and light stable resinous composition as defined in claim 20 wherein the organotin ethanol mercaptide is bis[monobutyltin di(ethanol mercaptide)]sulfide.

22. An organotin ethanol mercaptide selected from the group consisting of
a. compounds having the structural formula

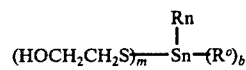

wherein R represents an alkyl group having 1 to 8 carbon atoms;
R° represents —SCH$_2$COOR" or —SR";
R" represents an alkyl group having 6 to 18 carbon atoms;
$b$, $m$, and $n$ each represents 1 or 2; and
$m + n + b = 4$; and
b. compounds having the structural formula

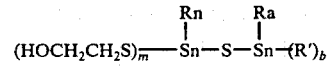

wherein R and R" have the aforementioned significance;
R' represents —SCH$_2$CH$_2$OH, —SCH$_2$COOR", or —SR";
$a$, $b$, $m$, and $n$ each represents 1 or 2;
$a + b = 3$; and
$m + n = 3$.

23. An organotin ethanol mercaptide as defined in claim 22 that is monobutyltin mono(isooctyl thioglycolate) di(ethanol mercaptide).

24. An organotin ethanol mercaptide as defined in claim 22 that is monobutyltin mono(dodecyl mercaptide) di(ethanol mercaptide).

25. An organotin ethanol mercaptide as defined in claim 22 that is bis[monobutyltin di(ethanol mercaptide)]sulfide.

* * * * *

UNITED STATES PATENT AND TRADEMARK OFFICE
CERTIFICATE OF CORRECTION

PATENT NO. : 4,059,562
DATED : Nov. 22, 1977
INVENTOR(S) : Samuel Hoch, Mario Q. Ceprini and Emery Szabo It is certified that error appears in the above-identified patent and that said Letters Patent are hereby corrected as shown below:

Column 2, line 42, change "m + n + = 4" to -- m + n + b = 4 --.

Column 9, line 47, change "R®" to -- $R^o$ --.

Signed and Sealed this

Fourteenth Day of March 1978

[SEAL]

Attest:

RUTH C. MASON
Attesting Officer

LUTRELLE F. PARKER
Acting Commissioner of Patents and Trademarks